Jan. 9, 1934. E. ÖMAN ET AL 1,942,767
METHOD OF DISTILLING NONMISCIBLE SUBSTANCES IN COLUMNS
Filed Feb. 27, 1931
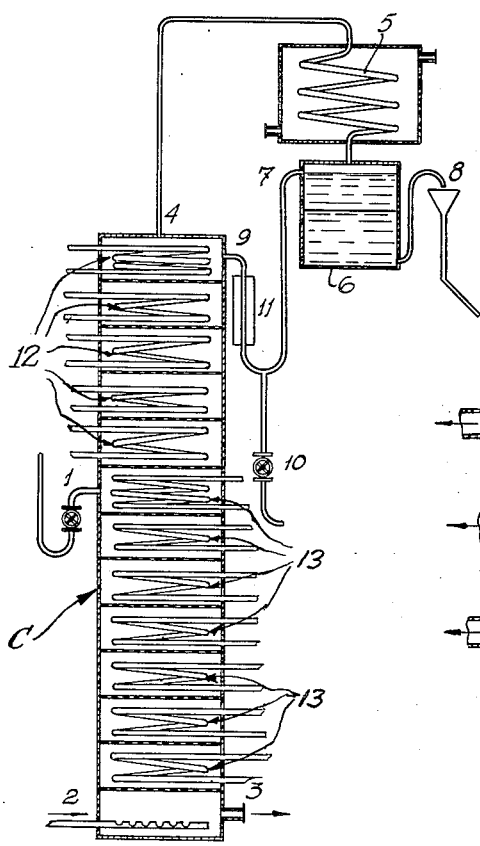
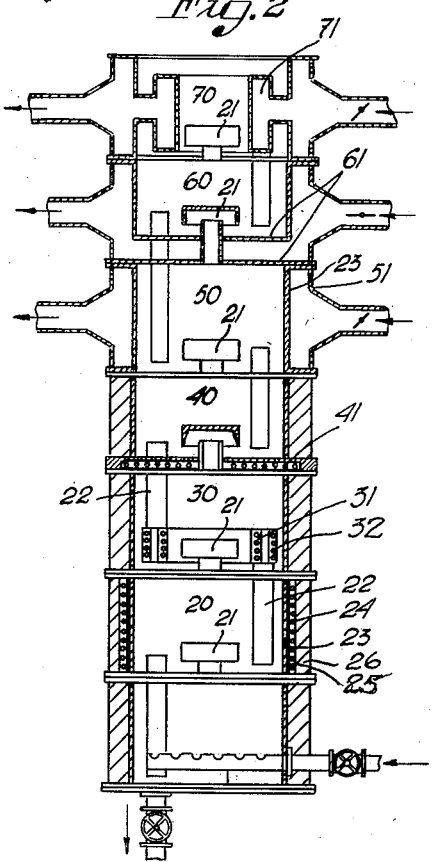

Patented Jan. 9, 1934

1,942,767

UNITED STATES PATENT OFFICE 1,942,767

METHOD OF DISTILLING NONMISCIBLE SUBSTANCES IN COLUMNS

Erik Öman, Stocksund, and Sven Harald Ledin, Stockholm, Sweden,

Application February 27, 1931, Serial No. 518,826, and in Sweden March 3, 1930

4 Claims. (Cl. 202—40)

The present invention relates to improvements in or relating to fractional distillation of resins, products of resins or resinous substances.

If such substances are distilled in columns, in the presence of superheated steam, irregularities sometimes occur, the result of which is that the heavy fraction obtained contains large quantities of the more volatile substance or substances.

The cause of these irregularities is that in certain parts of the column a very considerable temperature drop may occur in spite of a very careful heat insulation. Such a temperature drop has the effect of lowering the vapor tension above the liquid, whereby also the evaporation of the more volatile substance or substances is lowered, the reason being that as the temperature falls the partial pressure of the more volatile substance is lowered, the conditions otherwise remaining the same. According to the present invention resins, products of resins or resinous substances are distilled in columns with a gas or a vapor which is not miscible with the said resins or the like in the liquid form, and heat is supplied to different stages of the distillation or as the case may be to different parts of the column separately by other means than steam.

In the distillation of resins, products of resin or resinous substances fairly high temperatures are required. It is, however, far from easy to provide these high temperatures when using steam as heating medium. The steam must either be used in the form of superheated steam, which has the disadvantage that only the superheat of the steam, which is relatively small, can be utilized, or the steam must be supplied and used under high pressure, which naturally tends to increase the cost of the apparatus; at the same time the heat transmission is lowered on account of the thicker walls required in the steam tubes or steam chambers. According to the present invention the heat is therefore supplied to the different stages of the distillation or to the different parts of the column by other means than steam, for instance hot gases or liquids or by means of electric energy. In this way it is possible to attain the high temperatures required in the distillation of above substances without having to resort to high pressures, and by reason of the fact that heat is supplied to different parts of the column the liquid is maintained at the desired temperatures in the different stages.

When using hot gases or liquids, for instance combustion gases, the heat may be supplied in different ways, for instance by providing coils in the different chambers or by providing the partitions between the chambers or the mantle surrounding the column with double walls and passing the hot gases or liquids through these coils or between these double walls. In certain circumstances the gases may be passed in direct contact with the substances or liquids to be distilled.

Electric heating elements may also in a similar way be arranged in the partitions between the chambers or in the mantle of the column and within or outside of the column.

Whether hot gases or liquids or electric energy is used for the heating the arrangements may be such that the liquid in the different chambers may be heated to and maintained at different temperatures. Further it is not necessary that all chambers be provided with heating arrangements as described above, as in some cases heat may be supplied only to some of the chambers.

The invention will now be described in greater detail with reference to the accompanying drawing, in which Figs. 1 and 2 are diagrammatic representations, in vertical section, of two forms of distilling apparatus embodying the principles of the present invention.

Fig. 1 shows an apparatus which may be used for distilling resins as described above. The resin is introduced through the conduit 1 and superheated steam or hot gases are supplied through the pipe 2 into the column C. The heavy fraction, separated from the more volatile components, is discharged at 3 and water and the more volatile components leave the column at 4. The vapors are condensed in the condenser 5 and the condensed liquid is separated in the separator 6, so that water leaves at 8 and the higher boiling fraction at 7. Part of the latter is returned to the column through the pipe 9 and part is removed at 10. Heat is supplied by introducing hot gases or hot liquid in the heating coils 12 and 13 and in this way the temperature required for each chamber is obtained and maintained. It is also of advantage to heat at 11 that part of the fraction which is returned to the column at 9.

The resin supplied to the column at 1 is preferably preheated, so that the temperature of the same when entering the column is somewhat lower than, equal to or higher than the temperature in the column.

The superheated steam (or other vapor or gas) introduced into the base of the column may have a temperature lower than, equal to or higher than the temperature of the liquid in the column. It is often preferable to have this vapor superheated to a temperature higher than that in the column.

The reflux condenser 5 may either be given such dimensions that all vapors from the column are condensed or so that water vapor is not condensed. As a result of this lowering of the temperature of the gases part of the higher boiling fraction is condensed, the condensate preferably being returned to the column.

The distillation may, as shown in Fig. 1, be carried out by means of still and rectifier, but it is also possible in some cases to use only a still.

The heat is preferably supplied to the liquid in the column but may also be supplied, partly or wholly, to the vapors.

In Fig. 2 are shown different ways of supplying the heat to the chambers 20, 30, 40, 50, 60 and 70. 21 are the usual bells or hoods and 22 the overflows for the passage of steam and liquid from one chamber to another. In chamber 20 there is provided round the wall 23 of the column a heating resistance 24. 25 is an electrically insulating layer and 26 is the ordinary heat insulation.

In chamber 30 the resistance element is in the form of two rings 31, 32 in contact with the liquid on the partition plate.

In chamber 40 the resistance element 41 is arranged in the partition wall.

The chambers 50, 60 and 70 are provided with arrangements for supplying heat by means of hot gases or liquids.

In chamber 50 the wall 23 of the column is surrounded by an outer wall 51 and hot gas or liquid is introduced between these walls.

In chamber 60 the bottom 61 is also made double so as to increase the heat transmission area.

In chamber 70 the wall of the chamber is double and in addition a hollow heater 71 is provided within the chamber.

When using hot gases as heating medium air may be introduced for cooling and for regulating the temperatures in the different chambers. It is also understood that it is possible to supply the required heat by condensing a gas or vapor in the heating chambers described, provided that the temperature at which the gas or vapor condenses is sufficiently high to maintain the temperature required. It is also possible to heat the liquid to be distilled by withdrawing it from the chamber, heating it and returning it to the chamber.

The following is an actual example of the distillation of a liquid resin in an apparatus of the type shown in Fig. 1 but provided with resistance elements instead of coils.

The resin was first dehydrated by heating to a temperature of 130–140° C. and was then, after preheating to about 150° C., introduced into the column. The column used had 15 chambers, nine in the still and six in the rectifier. The temperatures in these chambers were as follows:

In the top chamber of the still, into which the resin was introduced, the temperature was maintained at 280° C. From this chamber the temperature rose gradually in the lower chambers, so that in the lowest chamber of the still, in which vapor was introduced through pipe 2, a temperature of 300–310° C. was maintained. The vapor introduced in this lowest chamber was superheated to 300–325° C. Resin and pitch were discharged from the lowest chamber.

In the rectifier the temperature in the lowest chamber was about 280° C., gradually falling to about 250° C. in the top chamber. In the de-phlegmator the vapors were cooled to 220–225° C. and the reflux was returned to the top chamber of the rectifier.

For condensation of the fatty acids the vapors were cooled to below 150° C. but not below about 125° C. The fatty acids are thereby completely condensed but not the water vapor. This prevents the formation of emulsions of water in oil or of oil in water, whereas fatty acids from liquid resin otherwise have a great tendency to form emulsions with water.

The main part of the heat supplied is consumed in the upper part of the still where the greater part of the fatty acids are vaporized. Also in the upper part of the rectifier a greater quantity of heat is consumed in vaporizing the reflux from the dephlegmator.

The consumption of vapor is roughly 3 kilograms for each kilogram of distillate.

The latent heat of the resinous and fatty acids may be taken as 100 calories per kilogram.

It is preferable to regulate automatically the heat supplied so as to maintain a constant temperature or temperatures in the column.

It is understood that the distillation may be carried out at any pressure. It is also possible to conduct the distillation at such pressures and temperatures that a part of the vapor introduced at the base of the column is partially condensed in the column, but as a rule it is preferred to avoid such a condensation.

The column in which the distillation is carried out may be provided with partitions or with filling.

What we claim is:—

1. Method of distilling resins, products of resins, and resinous substances in liquid state with the vapor of a liquid which in liquid state is not miscible therewith, in a column constituted by a still and a superposed communicating rectifier each comprising a plurality of communicating chambers, characterized in that the resinous substance to be distilled, in liquid state, is introduced into the uppermost chamber of the still and the said vapor is introduced into the lowermost chamber of the still, and in that said still is heated at different temperatures at different points from top to bottom thereof, the temperature increasing by stages downwardly through the still, while in said rectifier a temperature is maintained at the bottom thereof substantially identical with the temperature maintained in the top of the still, the temperature decreasing by stages upwardly through the rectifier, by independently heating the column at each of a plurality of points therealong.

2. Method of distilling resins, products of resins, and resinous substances in liquid state with the vapor of a liquid which in liquid state is not miscible therewith, in a column constituted by a still and a superposed communicating rectifier each comprising a plurality of communicating chambers, characterized in that the resinous substance to be distilled, in liquid state, is introduced into the uppermost chamber of the still and the said vapor is introduced into the lowermost chamber of the still, and in that in said still a temperature of approximately 280° C. is maintained at the top thereof, the temperature increasing by stages downwardly through the still to approximately 310° C. while in said rectifier a temperature of approximately 280° C. is maintained at the bottom thereof, the temperature decreasing by stages upwardly through the rectifier to approximately 250° C. by independently heating the column at each of a plurality of points therealong.

3. Method as defined in claim 2, in which steam superheated to from about 300° C. to about 325° C. is introduced into the column to constitute the vapor immiscible with the resinous substance in the liquid state.

4. Method as defined in claim 2, in which vaporous products leaving the rectifier are cooled to from 150° C. to not below about 125° C. whereby to prevent the formation of emulsions therein.

ERIK ÖMAN.
SVEN HARALD LEDIN.